United States Patent [19]
Morton et al.

[11] Patent Number: 5,724,071
[45] Date of Patent: Mar. 3, 1998

[54] DEPTH IMAGE DISPLAY ON A CRT

[75] Inventors: Roger A. Morton, Penfield; Roy Y. Taylor, Scottsville, both of N.Y.

[73] Assignee: Eastman Kodak Company, Rochester, N.Y.

[21] Appl. No.: 378,855

[22] Filed: Jan. 25, 1995

[51] Int. Cl.⁶ .............................. G09G 3/22; H04N 13/00
[52] U.S. Cl. ........................... 345/207; 348/658; 348/59
[58] Field of Search ......................... 345/3, 6, 13, 14, 345/207, 32, 9, 139; 348/42, 56, 59, 54, 658, 47; 359/23, 458, 464; 315/10

[56] References Cited

U.S. PATENT DOCUMENTS

| | | | |
|---|---|---|---|
| 4,571,616 | 2/1986 | Haisma | 358/88 |
| 4,670,744 | 6/1987 | Buzak | 345/6 |
| 4,672,434 | 6/1987 | Suzuki et al. | 358/88 |
| 4,692,878 | 9/1987 | Ciongoli | 345/6 X |
| 4,945,408 | 7/1990 | Medina | 348/42 |
| 5,063,441 | 11/1991 | Lipton et al. | 348/47 |
| 5,083,199 | 1/1992 | Börner | 358/88 |
| 5,101,442 | 3/1992 | Amir | 348/42 |
| 5,181,103 | 1/1993 | Aoyama Tatsuya | 348/658 |
| 5,315,378 | 5/1994 | Satou et al. | 348/658 X |
| 5,343,119 | 8/1994 | Takuma | 315/10 |
| 5,349,379 | 9/1994 | Eichenlaub | 348/59 |
| 5,410,345 | 4/1995 | Eichenlaub | 348/59 |
| 5,483,254 | 1/1996 | Powell | 348/51 X |
| 5,541,642 | 7/1996 | Ashbey | 348/59 |

FOREIGN PATENT DOCUMENTS

| | | |
|---|---|---|
| 0 354 851 | 10/1989 | European Pat. Off. . |
| 94/06249 | 3/1994 | WIPO . |
| 94/20875 | 9/1994 | WIPO . |

*Primary Examiner*—Kee M. Tung
*Assistant Examiner*—John Suraci
*Attorney, Agent, or Firm*—Robert V. Wilder

[57] ABSTRACT

A CRT display system includes a CRT with a lenticular material placed upon the outward face of the CRT. The system further includes a sensing device in the field of view of the CRT and control circuitry connected between the sensing device and the CRT. The control circuitry is responsive to signals received from the sensing device to control the synchronization and formation of a composite of strips of visual input from four different perspective views of a scene to be presented on the CRT through the lenticular material such that a viewer perceives depth in the composite scene displayed on the CRT.

13 Claims, 3 Drawing Sheets

DEPTH IMAGE DISPLAY ON A CRT

FIELD OF THE INVENTION

The present invention relates generally to display systems and more particularly to an improved display system which provides a perception of depth to a viewer.

BACKGROUND OF THE INVENTION

Since the invention of television, manufacturers and designers of electronic devices and systems have continuously attempted to provide an apparatus with the capability of providing a viewer with the perception of three dimensional scenes. While many such devices and schemes have been devised and have provided limited access to the perception of three dimensional viewing, each such system has had significant limitations in quality and application such that none have been generally accepted or are in widespread or universal use today.

Many systems require the viewer to wear eye glasses of one kind or another in order to view two different perspective images on a screen which are coded in some manner but are decoded in the eyes of a viewer looking through the special viewing eye glasses. Generally, while initial curiosity generates some interest in such systems, it appears that over time such systems do not gain widespread acceptance.

Other schemes do not require the use of specialized eye wear but do require the adoption of new electronic protocols or standards or the manufacture of extensive and specialized non-standard equipment, to accomplish non-standard scanning for example, which is prohibitively expensive and extremely difficult to manufacture.

Some of the prior art systems have overcome many of the objectionable aspects of preceding systems but still have quality shortcomings which preclude widespread acceptance.

U.S. Pat. No. 3,932,699, now expired, discloses a CRT system including the use of a lenticulated grid over the face of a CRT for displaying three dimensional images. While that system is generally satisfactory from the standpoint that it does not require the use of special eyewear, problems may still occur as a result of the manufacture of the lenticular grid and the placement of that grid on the face of the CRT. It must be noted that the electron beam changes its modulation as it sweeps across the face of the CRT and that modulation may not always be in time-space synchronization with the layout of the lenticular grid on the CRT. If that occurs, there is a significant loss in picture quality.

Thus, there is a need for an improved CRT display system that does not require the use of any special eyewear and may be implemented using available manufacturing technology to provide a high quality three dimensional CRT display system that is capable of electronically adjusting a three dimensional display in order to compensate for defects in the display system which would otherwise cause substantial image quality degradation.

SUMMARY OF THE INVENTION

It is therefore an object of the present invention to provide a display system comprising a display device for displaying visual images, a sensing device arranged to sense a predetermined output of the display device and provide an output signal in response thereto, and a processing means connected between said display device and the sensing device, with the processing means being responsive to said sensing device output signal to provide a control signal, the display device being operable in response to the control signal to effect a modification of the sensed predetermined characteristic of said display device.

There is also provided a method for modifying the faceplate of a cathode ray tube comprising the steps of determining the number of juxtaposed pixels in one line across the faceplate of the cathode ray tube, and attaching one vertically oriented lenticular element on the faceplate for every set of a predetermined number of pixels in that one line, with the lenticular elements being attached in juxtaposed relationship with each other, and each lenticular element being placed over each set of the predetermined number of pixels.

Another embodiment teaches a method of adjusting the synchronization of images appearing on the face of a cathode ray tube comprising the steps of sensing the location of an image as actually displayed on said face; comparing the actually sensed location of the image with a predetermined image location; and modifying the actual location of the image on the cathode ray tube in a manner to minimize any difference between the sensed location and the predetermined location of the image.

Yet another embodiment of the present invention comprises a cathode ray tube having a plurality of elongated lens elements disposed in juxtaposed relationship with each other across the faceplate of the cathode ray tube, each of said lens elements having the elongated dimension thereof being substantially equal to one dimension of the cathode ray tube faceplate, with the shorter dimension of the lens elements being substantially equal to the distance across "p" picture element areas, where "p" is an integer greater than "1".

The present invention also provides a method of displaying three dimensional images on the faceplate of a cathode ray tube, comprising the steps of: storing "n" image frames of information, each image frame including data sufficient to effect the presentation of one image of a scene to be displayed, each image representing a different view of the scene taken from a different perspective; sequentially presenting the "n" image frames on the faceplate as the electron beam of the cathode ray tube is swept across the faceplate; sensing a predetermined characteristic of the displayed images as the images are actually presented on the faceplate; comparing the sensed predetermined characteristic of the displayed images with a programmed predetermined characteristic; providing a signal representative of any difference between the sensed and the actually displayed predetermined characteristic; and modifying the presentation of the images so as to minimize the difference signal.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Figure 1:
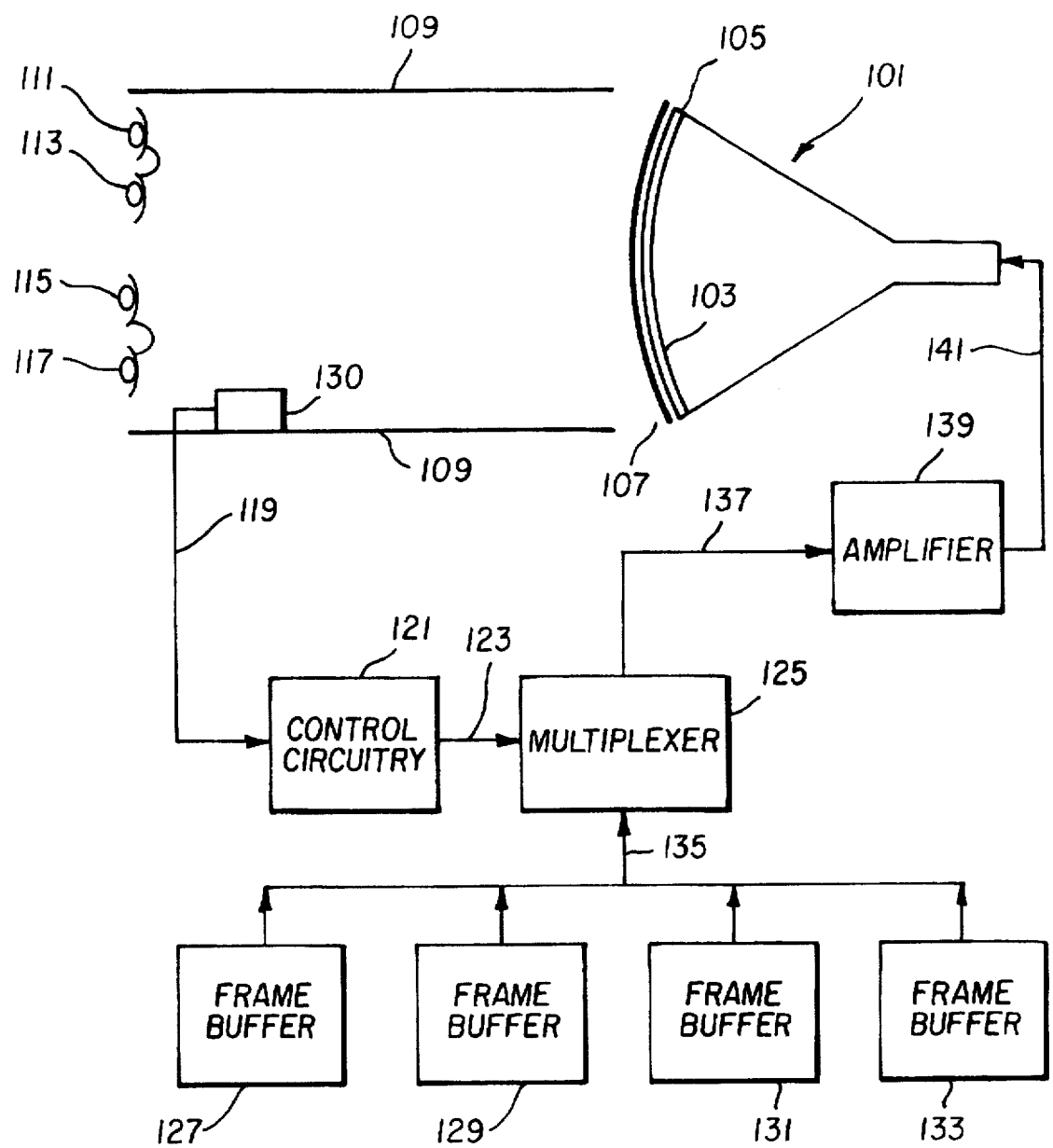
FIG. 1 is a schematic diagram illustrating a viewing system capable of displaying three dimensional scenes in accordance with the present invention.

Referring now to FIG. 1 in detail, there is shown a cathode ray tube (CRT) 101 which includes a relatively short duration phosphor coating 103 on a viewing screen 105. The viewing screen 105 has lenticular material 107 arranged thereon. As can be better observed in FIG. 3, the lenticular material 107 comprises a series of vertically oriented lenticules juxtaposed from one side to the other side across the face of the screen 105. The focal length of the lenticular material 107 is such that the phosphor surface 103 is in focus. The pitch of the lenticular material 103 may, for example, be such that there are three hundred lenticles across the width of the CRT face plate 105. To achieve a depth image comprising, in the present example, four views, (in general "n" different views or perspectives of the same scene where "n" is the integer "2" or more), at least 1200 effective pixels ("n" times 300) are required across the face of the CRT 101. In another example where "n" were "2", then only 600 effective pixels would be required across the CRT 101, that is 2 pixels per lenticule per CRT horizontal scan line. The number of lenticules will depend on the number of pixels available in any particular display as well as the dimensions of the display itself, and the desired quality of the displayed video.

In FIG. 1, an optionally implemented hooded means or enclosure 109 is shown to limit the viewing angle of the CRT 101 so that a viewer's eyes, for example 111 and 113, or 115 and 117, lie within a limited arc in front of the CRT defined by the hood or enclosure 109. By insuring that each eye sees a different one of four (in the present example) simultaneously presented views, a stereo or depth effect is achieved. In addition, parallax and motion effects are also achieved since the viewer may lie in other positions from which other views may be seen.

As shown in FIG. 1, a sensing means 130 is shown within the viewing chamber defined by the enclosure 109 to detect the impingement thereon of the CRT electronic beam. The positioning of the sensor 130 is such that it will intercept light from the CRT and thereby provide a signal representative of the relative positioning of the lenticular material as it is actually placed on the face of the CRT 101. The sensor 130 provides an input to a control device or control circuit 121 through a signal line 119. An output from the control circuit 121 is applied to a four way multiplexer 125 through signal line 123. The multiplexer 125 receives inputs through signal line 135 from four frame buffers 127, 129, 131 and 133. The term "signal line" as used throughout the present example, is not meant to be limited to a single connector but may include a plurality of connectors or even a bus running from one device to another. The number of frame buffers in any particular application will depend upon the number of views "n" being implemented in the system. Output signals from the multiplexer 125 are applied to an amplifier 139 through line 137 and the output of the amplifier 139 is applied to the CRT 101 to control the image or scene displayed on the face of the CRT 101.

Figure 2:
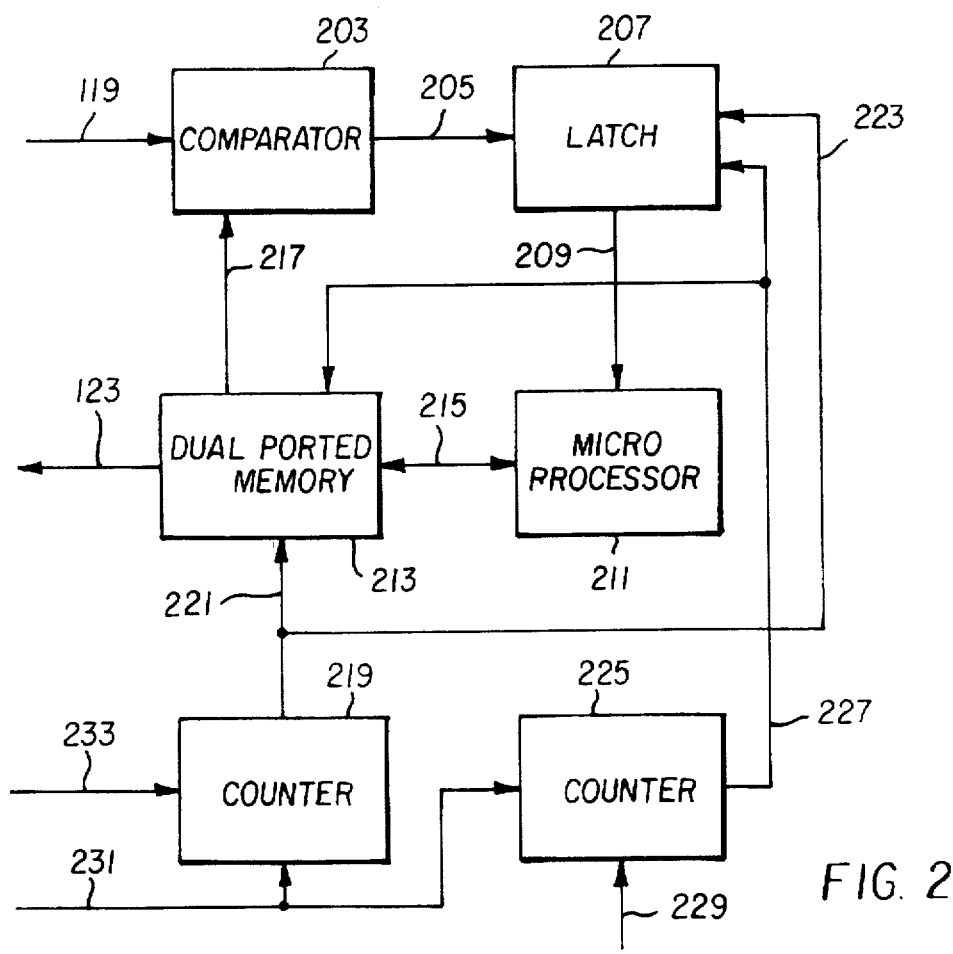
FIG. 2 is a block diagram showing the control circuitry implemented in one embodiment of the present invention.

Referring to FIG. 2, the control electronics 121 of FIG. 1 is shown in detail. Input signals are applied through line 119 and output signals to drive the multiplexer 125 of FIG. 1 are provided through line 123. The signals from the sensor 130 are applied to a comparator 203 which, in turn, is connected to a latching circuit 207 through signal line 205. The latching circuit 207 provides an input to a microprocessor 211 through line 209. The microprocessor 211 is connected to a dual ported memory 213 through a connector 215. The dual ported memory 213 provides one output on line 123 to drive the multiplexer 125, and another output on line 217 to the comparator 203.

A memory counter 219 receives an input sub-pixel signal on line 233 and a CRT horizontal synch signal on line 231 and provides an output signal on line 221 to the dual ported memory 213. The output signal on line 221 from the counter 219 is also applied to the latch circuit 207 through line 223. The CRT horizontal synch signal on line 231 is also applied to another memory counter 225. The memory counter 225 also receives the CRT vertical synch signal on line 229 and applies an output signal on line 227 to the latch circuit 207 and also to the dual ported memory 213.

Figure 3:
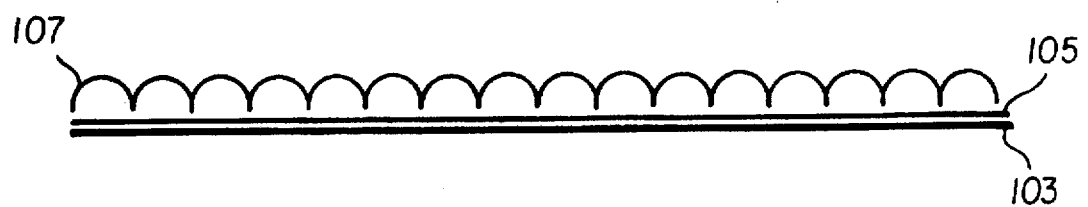
FIG. 3 is an illustration of a cross section of the display screen shown in FIG. 1.

In FIG. 3, a more detailed cross-sectional view of a portion of the display screen in a horizontal plane is shown including the lenticular material 107 disposed upon the outside of the CRT faceplate 105. The phosphor coating 103 on the inside of the CRT 101 is also shown.

Figure 4:
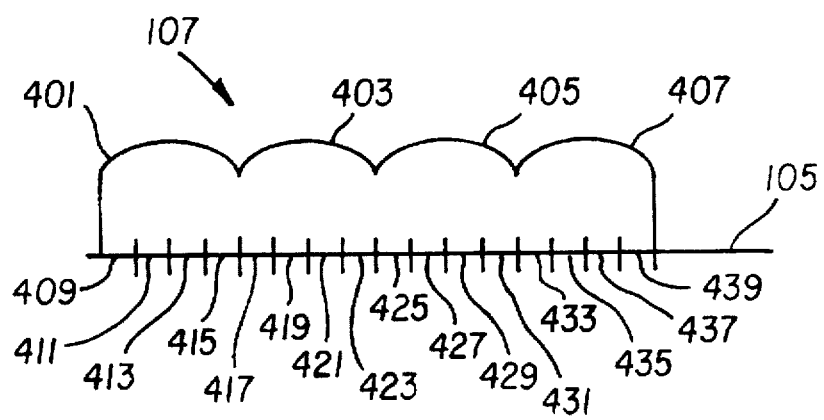
FIG. 4 is an illustrational view of a portion of the display screen shown in FIG. 3.

FIG. 4 shows a portion of the section shown in FIG. 3. Individual lenticules 401, 403, 405 and 407 are shown in position upon the faceplate 105 of the CRT 101. The lenticules are placed in vertical alignment in juxtaposed relationship with each other and extending across the face of the CRT 101. The phosphor coating 103 is omitted from FIGS. 4 and 5 in order to more clearly illustrate the individual picture elements or pixels which are separated by hash marks on the faceplate 105. In the present example, lenticule 401 of the lenticular material or coating 107 is situated over four pixel locations 409, 411, 413 and 415 on the display screen 105. Similarly, because of the operation of the circuitry shown in FIG. 1 and FIG. 2, four successive pixels 417, 419, 421 and 423 are positioned under the lenticules. The next four pixels 425, 427, 429 and 431 lie below lenticle 405 and the last lenticule 407 shown in FIG. 4 is located above the next four pixels 433, 435, 437 and 439. As shown, when an electron beam sweeps horizontally across the CRT faceplate 105, the beam will cause a point of light to appear at each pixel location on the screen in sequence on each horizontal scan of the screen. The present invention applies to display devices having either interlaced or non-interlaced scans. The points of light appearing at the pixels pass through the lenticular material 107 and are refracted out of the material 107 toward the viewers shown, for example, in FIG. 1.

Figure 5:
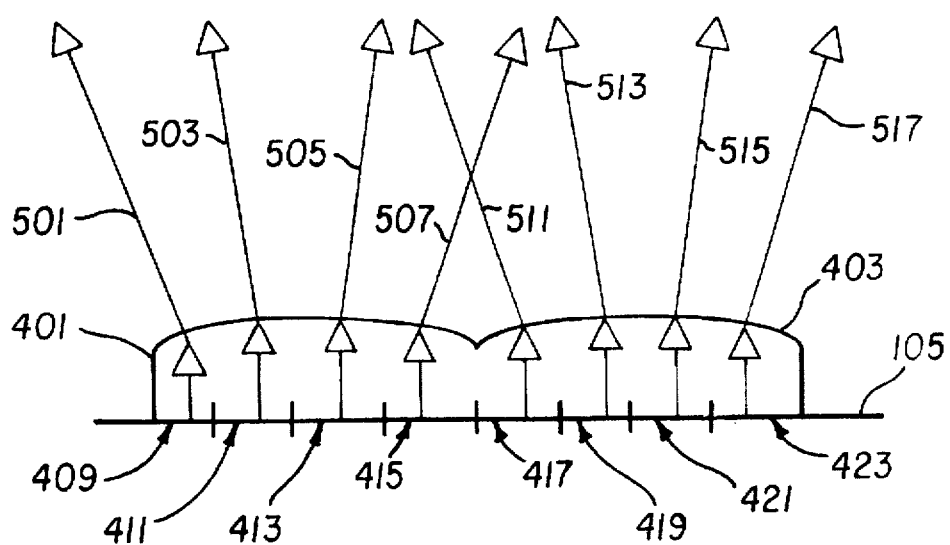
FIG. 5 is an illustration of a portion of the display screen implemented in the present exemplary embodiment and showing the optical aspects thereof.

In FIG. 5, two of the lenticles 401 and 403 are shown in detail along with the light rays emanating from the corresponding pixel areas 409–423. As illustrated, light ray 501 is projected from the first pixel area 409 through the lenticule 401 and out of the lenticular material 107 toward the viewers shown in FIG. 1. Similarly, a second light ray 503 in the present example, comes from pixel area 407 and third and fourth light rays 505 and 507 come from corresponding pixel areas 413 and 415, respectively. With regard to the juxtaposed lenticule 403, first, second, third and fourth light beams 511, 513, 515 and 517 also come from corresponding pixel areas 417, 419, 421 and 423 on the faceplate 105 and are refracted by the lenticular material 107 toward a viewing area. In the present example, four pixels per lenticule are illustrated although only two pixels per lenticule need be used to achieve the desired stereo effect of the images displayed on the CRT 101.

Figure 6:
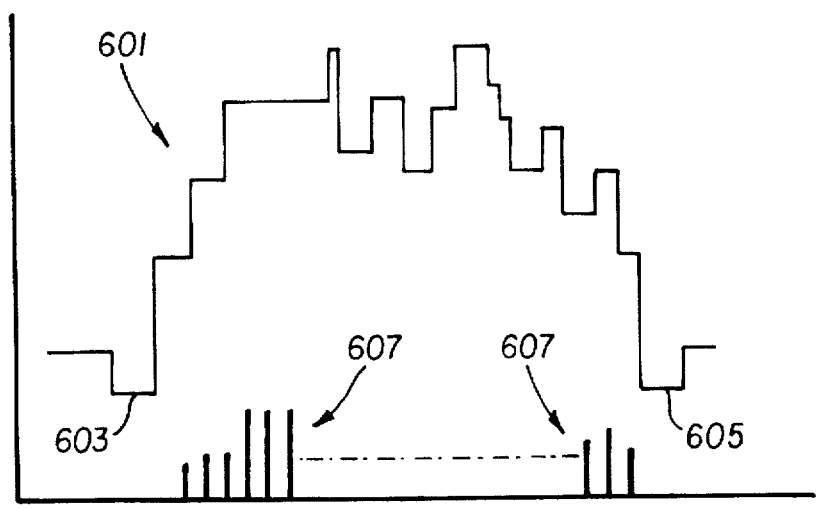
FIG. 6 is an illustration of the relationship between selected operating signals in the disclosed embodiment of the present invention.

FIG. 6 illustrates the display signal 601 which is applied the the electron beam of a CRT 101 to create the images appearing on the CRT screen. The variance in the signal shown represents the changing intensity of the beam as it is swept across the face of the CRT 101 in one horizontal scan. Sequential horizontal scan signals 603 and 605 are shown relative to the display signal and appear at the beginning of each new horizontal scanning of the screen as the electron beam is swept incrementally downwardly after each horizontal scan. The signal pulses 607, which are generated by the sensing device 130, are also shown relative to the information or display signal 601 and the horizontal scan pulses 603 and 605.

In operation, as can be seen with reference to FIGS. 4 and 5, the lenticular material 107 is placed upon the face of the CRT 101 such that, for example, when there are four pixels per lenticle, the light at each pixel is refracted from the display screen at a different angle toward a viewer. Since the lenticular material is laid in vertically oriented strips across the screen of the CRT 101, a viewer will see finely spaced strips or columns of a picture or image being displayed. When those strips or slices are presented such that each represents a view of the same scene taken from horizontally displaced positions, then a stereo effect is achieved and an image appears to have a dimension of depth. As hereinbefore noted, the stereo effect can be achieved with only two pixels per lens. With two pixels, only two perspectives of the same scene are displayed but the three dimensional or stereo effect is still apparent.

When the pixels are sufficiently small, a viewer sees a full two dimensional image with each eye even though there are actually strips of four perspectively different views of the same image being displayed on the face of the CRT 101 at any given time. The viewer sees only the image being refracted toward the viewing eye which, as is apparent in FIG. 5, is created or composed in the viewer's eye, by every fourth pixel in the present example. The lenticular material 107 is situated such that from any single point of view within the viewing area in front of the CRT 101, only one image is seen and the pixels forming that one image in the present example are comprised of every fourth pixel across the screen. Each lenticle is, in the present example, thirty-three thousandths (0.033) of an inch horizontally across. Accordingly, a screen ten inches across will have three hundred (300) vertically oriented lenticular elements juxtaposed across the face of the CRT 101.

In the present example, there are four perspective views of each scene to be displayed. For a motion picture, there will be four perspective views of each frame of the film. This may, of course be provided by using four cameras or by artificial means or animated creations. Taking one pixel line across the face of a CRT such as shown in FIG. 5, successive pixels of the first perspective view will be presented at pixel 409 and 417 and every fourth pixel thereafter across the face of the CRT 101. Successive pixels of the second perspective view of the same scene will be present at pixels 411 and 419 and every fourth pixel thereafter across the face of the display. Similarly, the third and fourth perspective views of the same scene are present at subsequent and corresponding pixels 413 and 421 respectively, and 415 and 423, respectively. Thus, in the present example, each perspective view of the same scene is projected from the display in a different direction such that at any single viewing point, for example at each viewer eye location 111, 113, 115 and 117, a different perspective of the displayed scene can be perceived as the strips of the respective perspective views are merged together into one image. In the present example, there are four perspective views presented to achieve the three dimensional or stereo effect.

Alignment of each composite image to the lenticular material 107 is achieved by using an external sensor 130 mounted in a position that can intercept light from the CRT 101. The sensor 130 will generate a signal when the beam on the CRT 101 is in a position where the light is captured by a lenticule and imaged back to the sensor 130. The sensor 130 in turn will thereby generate a series of pulses 607, as shown in FIG. 6, responsive to the light rays received thereby. That sensor signal is sent to the control electronics 121. The electronic control circuitry is pre-calibrated by an initial calibration cycle to compensate for the offset in position of the sensor, so that the actual position of the beam, as viewed by the viewer with respect to the lenticular material 107 can be determined.

The output control signal signal from the control circuitry 121 is applied to the four-way multiplexer 125 (in general an "n" way multiplexer where "n" is the number of views) which mixes or multiplexes the image signals sent to the CRT 101 to accomplish the juxtaposition of the four perspective image slices in sequential fashion as hereinbefore explained. Each perspective view of the four perspective views of the scene to be displayed at any one moment, is stored in corresponding sequential frame buffers 127, 129, 131 and 133 as shown in FIG. 1. The output of one of four frame buffers is selected by an enabling signal applied from the control circuitry 121 to the multiplexer 125 to modulate the electron beam as it sweeps across the screen of the CRT 101. In the present example, the output of sequential frame buffers will be applied to the CRT 101 for each pixel across the face of the viewing screen. The multiplexer 125 functions as a gating means to gate the appropriate frame information to the CRT 101. The output of the multiplexer 125 on line 137 is sent to the CRT 101 via the amplifier 139, to modulate the beam on the CRT 101, thereby writing the correct view from the frame buffer in optical alignment with the lenses on the lenticular material 107.

As shown in FIG. 2, the CRT horizontal synch signal on line 231 is applied to initiate the memory counter 219 which counts sub-pixel pulses generated and applied to the counter 219 on line 233. The sub-pixel pulses would, for example, correspond to five pulses per pixel position. Accordingly, in the present example, there would be six thousand pixels across one scan line. In addition, a second counter 225 counts horizontal synch pulses and is initiated by the CRT vertical synchronizing signal applied on line 229. Those signals represent the position of the electron beam on the face of the CRT 101 and are sent as addresses to the dual ported memory 213 by way of signal lines 221 and 227. The dual ported memory applies the control signal to the multiplexer 125 of FIG. 1 to control which of the frame information is applied to the CRT 101. The processor 211 independently reads and writes memory locations of the dual ported memory 213 and generates compensating offsets to correct for the positional offset of the sensor 130 within the viewing area in front of the CRT 101.

The output of data from the addresses defined by counters 219 and 225 is used to drive the multiplexer 125 through line 123. An additional output on line 217 is compared with the signal on line 119 and if the two signals are not in alignment, an error signal is generated which triggers the latching of values of the counters 219 and 225 in latching circuit 207 of the value of the signals on lines 227 and 223. This latched data is sensed by the processing device or microprocessor 211. The initial values in the memory corresponding to the data on line 217 are generated by displaying a white image on the cathode ray tube 101. The individual locations of the output of each pulse from sensor 130 is latched, thereby providing a relationship between the counters 219 and 225 and the pulses of light as seen through the lenticular material 107. Software within the microprocessor 211 then computes the actual contents of the data coming from line 123 from memory 213 corresponding to the desired switch points for the various views. Comparator 203 monitors drift between the calibrated position of the beam with respect to the lenticle and the actual position of the beam during viewing. In some applications, it may also be desirable to track slow movement of the viewer while ignoring rapid movements which may be made to sense parallax. That would allow the viewer to have the central views in long-term alignment with his position.

Thus, there has been provided, in accordance with the present invention, a display system including a CRT, which has a lenticular material disposed upon the screen of the CRT, a light sensing device positioned within the viewing area of the CRT and control electronics connected between the sensor and the CRT and effective to calibrate the timing and presentation of a plurality of scene portions on the face of the CRT with the geometry of the lenticular material in order to effect the presentation of images on the CRT screen having an apparent dimension of depth.

The apparatus of the present invention has been described in connection with the preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention as defined by the following claims.

Parts List:
101 Cathode ray tube (CRT)
103 Phosphor coating
105 Face plate
107 Lenticular material
109 Enclosure
111 Viewer's eyes
113 Viewer's eyes
115 Viewer's eyes
117 Viewer's eyes
119 Signal line
121 Control circuit
123 Line
125 Multiplexer
127 Frame buffer
129 Frame buffer
130 Sensing means
131 Frame buffer
133 Frame buffer
135 Signal line
137 Line
139 Amplifier
203 Comparator
205 Line
207 Latching circuit
209 Line
211 Microprocessor
213 Dual ported memory
215 Connector
217 Line
219 Memory counter
221 Line
223 Line
Parts List Cont'd
225 Memory counter
227 Line
229 Line
231 Line
233 Line
401 Lenticules
403 Lenticules
405 Lenticules
407 Lenticules
409 Pixel
411 Pixel
413 Pixel
415 Pixel
417 Pixel
419 Pixel
421 Pixel
423 Pixel
425 Pixel
427 Pixel
429 Pixel
431 Pixel
433 Pixel
435 Pixel
437 Pixel
439 Pixel
501 Light ray
503 Light ray
505 Light ray
507 Light ray
511 Light beam
513 Light beam
Parts List Cont'd
515 Light beam
517 Light beam
601 Display signal
603 Horizontal scan signal
605 Horizonal scan signal
607 Signal pulses

What is claimed is:

1. A display system comprising:

a display device for displaying a three dimensional visual image;

a sensing device arranged to sense the location of the image on the display device and provide an output signal in response thereto; and a processing means connected between said display device and said sensing device, said processing means being responsive to said sensing device output signal to provide a control signal, said display device being operable in response to said control signal to modify the location of the image on said display device;

wherein the display device is a cathode ray tube which further includes a faceplate for displaying the visual images and a lenticular grid means disposed upon said faceplate, said lenticular grid means being operable to disperse light rays from said faceplate in accordance with a predetermined dispersion pattern;

and wherein said sensing device comprises a light sensor arranged to sense light rays emanating from said lenticular grid means.

2. The invention as set forth in claim 1 wherein said lenticular grid means comprises a plurality of vertically oriented lenticular elements disposed in juxtaposed relationship across the width of the faceplate of the cathode ray tube.

3. The invention as set forth in claim 2 wherein the faceplate is divided into picture element areas, said lenticular grid means including one of the lenticular elements disposed over every two adjacent picture element areas across the faceplate of the cathode ray tube.

4. A display system comprising:

a display device for displaying a three dimensional visual image;

a sensing device arranged to sense the location of the image on the display device and provide an output signal in response thereto; and a processing means connected between said display device and said sensing device, said processing means being responsive to said sensing device output signal to provide a control signal, said display device being operable in response to said control signal to modify the location of the image on said display device;

wherein said processing means includes:

control circuitry connected to said sensing device, said control circuitry being responsive to said sensing device output signal to provide a control signal;

gating means connected between said control circuitry and the display device; and first memory means connected to said gating means, said first memory means being operable to store a first plurality of frames of image data, each of said frames being effective when applied to the display device to generate the presentation of a different image on the display device, said gating means being further operable in response to said control signal to enable a selected one of the image data frames to be applied to the display device.

5. The invention as set forth in claim 4, wherein said first plurality of frames of image data comprises "n" frames where "n" is an integer greater than "1".

6. The invention as set forth in claim 5 wherein said display device comprises a cathode ray tube, said cathode ray tube further including a second plurality "m" of lenticular elements disposed on the display screen of the cathode ray tube.

7. The invention as set forth in claim 6 wherein "n" is a multiple of "m".

8. The invention as set forth in claim 6 wherein said cathode ray tube includes a third plurality "p" of picture element areas defining the smallest areas of resolution on the display screen, and wherein the number of lenticular elements "m" is equal to the number of picture elements "p" in one horizontal line across the face of the display device, divided by the number of frames of image data.

9. The invention as set forth in claim 5 wherein said gating means is a multiplexer, said first memory means comprising at least two memory buffers, each of said memory buffers being operable to store one of said frames of image data.

10. The invention as set forth in claim 5 wherein said control circuitry further comprises:

address means responsive to horizontal and vertical synch signals of the cathode ray tube for providing address signals representative of the position of the electron beam on the face of the cathode ray tube; and second memory means responsive to said address signals for providing said control signal.

11. The invention as set forth in claim 10 wherein said control circuitry further includes:

a comparator means responsive to said sensing device output signal and said address signals for providing a difference signal representative of the difference between the sensing device output signal and said address signals.

12. The invention as set forth in claim 11 and further including:

latching means connected between said address means and said comparator means, said latching means being responsive to said address signals and said difference signal to store the address signals whenever a predetermined condition appears in the difference signal.

13. The invention as set forth in claim 12 and further including:

a processing device connected between said latching means and said second memory means, said processing device being operable in response to said stored address signals to generate a calibration signal for application to said second memory means, said second memory means being responsive to said calibration signal for modifying said control signal in accordance therewith.

* * * * *